Figure 1:
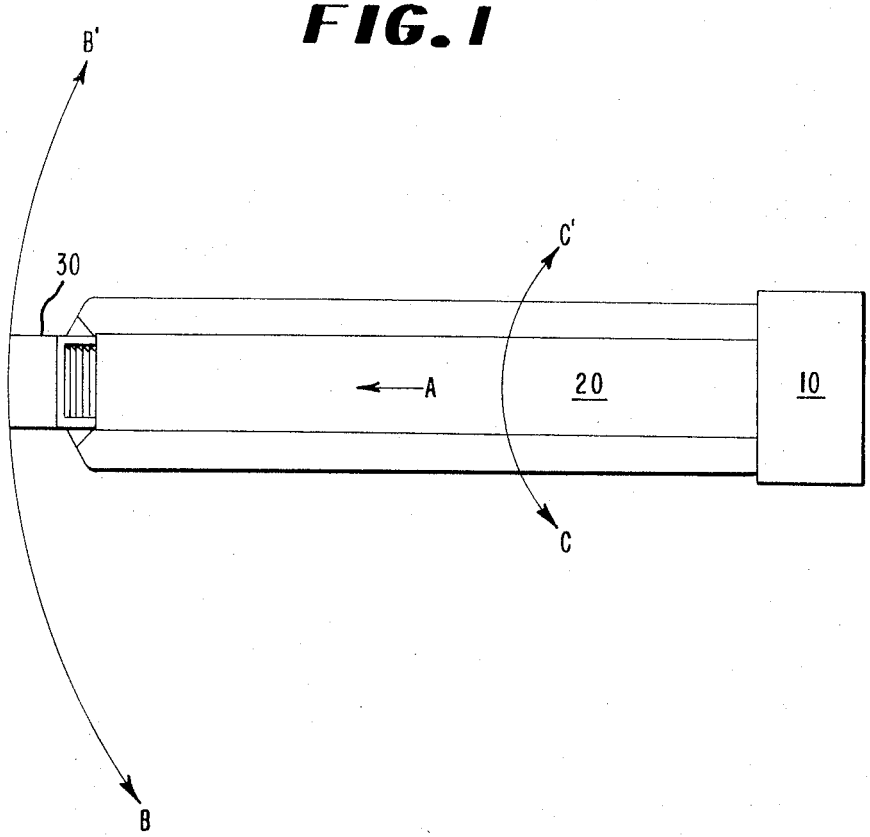
Figure 2:
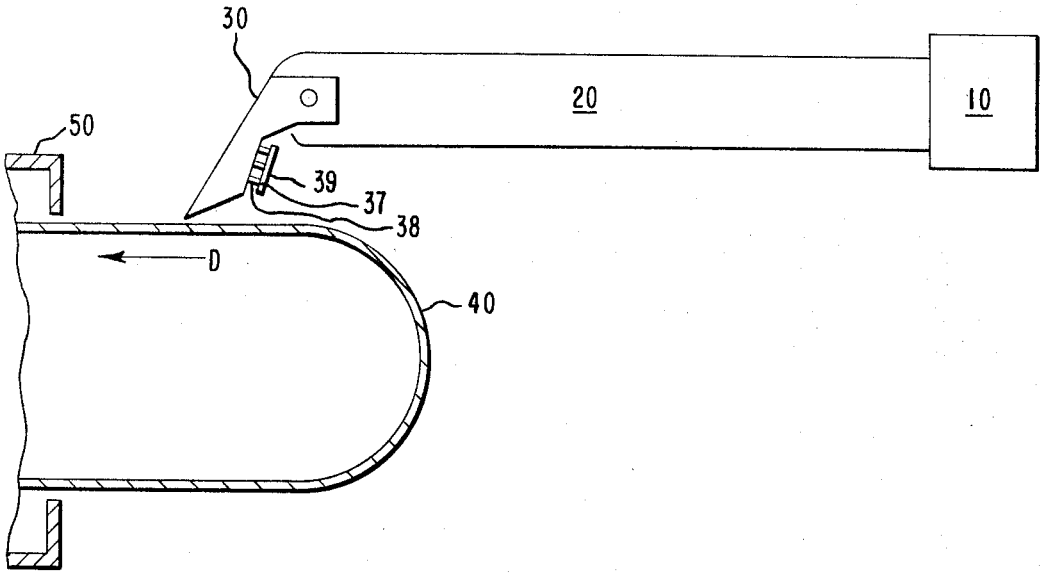
Figure 3:
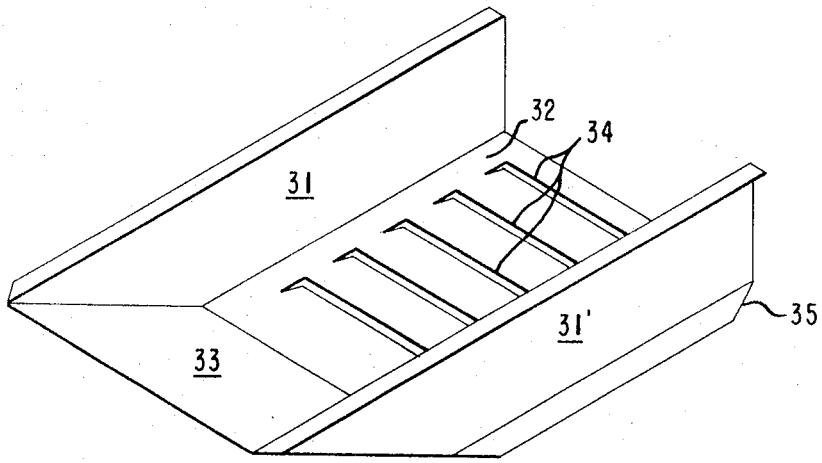
Figure 4:
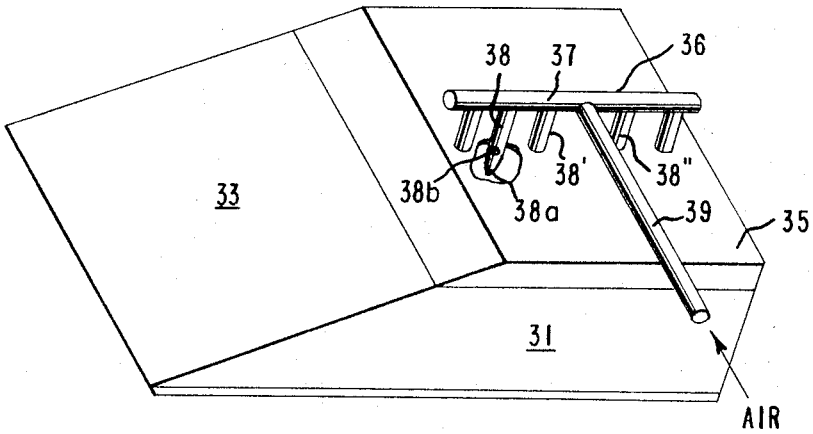

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 8

T927,006
PLURAL CONVEYOR WITH AIR CUSHIONED TRANSFER CHUTE

Hendrik Goverts, Volgerland 7, Zwijndrecht, Netherlands

Filed Aug. 24, 1973, Ser. No. 391,454
Int. Cl. B65g *47/00*
U.S. Cl. 198—43
2 Sheets Drawing. 4 Pages Specification

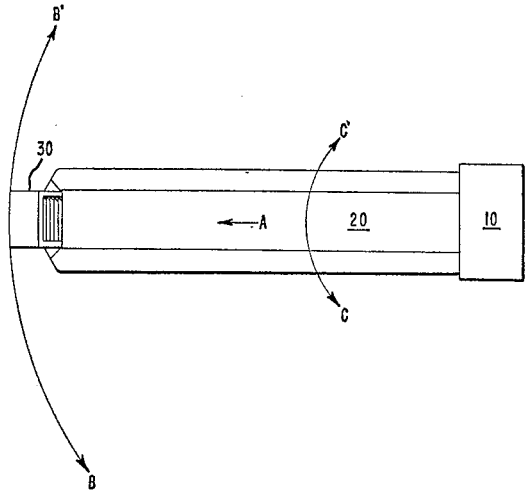

A delivery apparatus for supplying particulate material to a moving surface includes an endless driven belt having an oscillating discharge end for the material. A chute is attached to the discharge end of the endless belt and extends downward and outward from the belt. A plurality of transverse louvers in the chute bottom are arranged to receive a supply of compressed air and a cushion of air is formed in the chute to support the particulate material as it passes from the endless belt to the moving surface.

PLURAL CONVEYORS WITH AIR CUSHIONED TRANSFER CHUTE

Filed Aug. 24, 1973 2 Sheets-Sheet 1

PLURAL CONVEYORS WITH AIR CUSHIONED TRANSFER CHUTE

Filed Aug. 24, 1973 2 Sheets-Sheet 2